(12) United States Patent
Shiino et al.

(10) Patent No.: US 6,485,196 B2
(45) Date of Patent: Nov. 26, 2002

(54) OPTICAL FIBER CORD FIXING COMPONENT

(75) Inventors: Masato Shiino, Tokyo (JP); Naoko Shimoji, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/893,313

(22) Filed: Jun. 26, 2001

(65) Prior Publication Data

US 2002/0031311 A1 Mar. 14, 2002

(30) Foreign Application Priority Data

Sep. 14, 2000 (JP) .......................................... 2000-279397

(51) Int. Cl.[7] .................................................. G02B 6/36
(52) U.S. Cl. .............................. 385/87; 385/86; 385/76
(58) Field of Search ................................ 385/87, 86, 76

(56) References Cited

U.S. PATENT DOCUMENTS 5,142,601 A * 8/1992 Shibata et al. ................ 385/86

* cited by examiner

Primary Examiner—Robert H. Kim
Assistant Examiner—Elizabeth Gemmell
(74) Attorney, Agent, or Firm—Knobbe, Martens, Olson, & Bear LLP

(57) ABSTRACT

A fixing component for fixing an optical fiber cord to an optical connector in a press-fitting manner by compression deformation is formed with a connected combination of a tension member fixing portion for fixing, in a press-fitting manner, a tension member of the optical fiber cord put on an outer peripheral surface of the optical connector to the outer peripheral surface and a sheath fixing portion for fixing, in a press-fitting manner, a sheath of the cord put on the outer peripheral surface of the connector to the outer peripheral surface, and has a slit formed between the tension member fixing portion and the sheath fixing portion, and adapted to absorb compressed and deformed part of either or both of the two fixing portions.

3 Claims, 6 Drawing Sheets

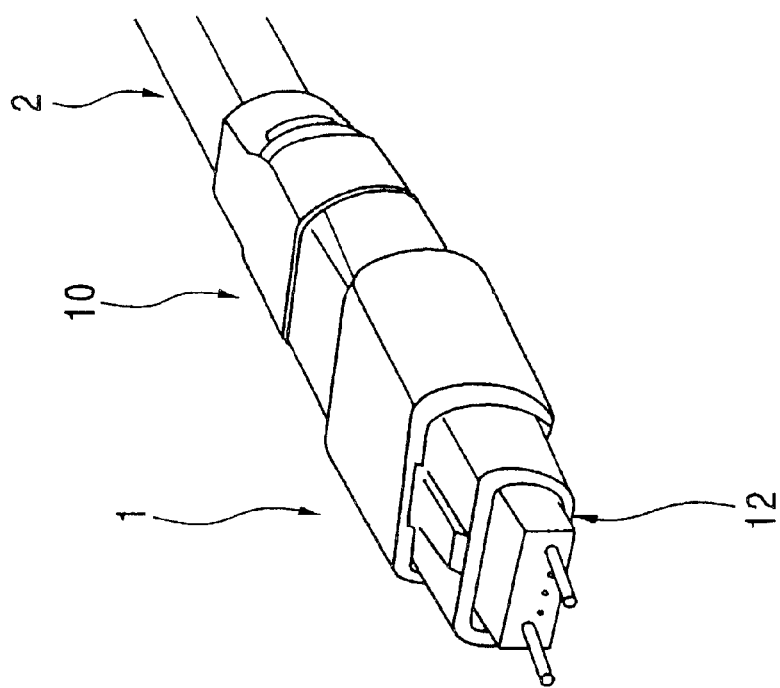

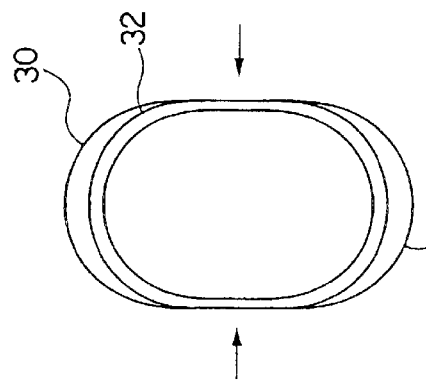
FIG. 5B
PRIOR ART
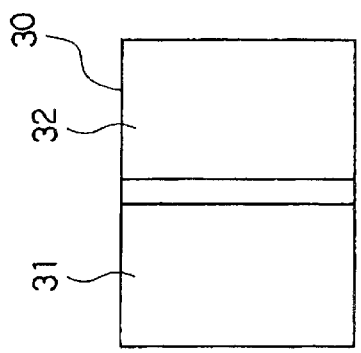
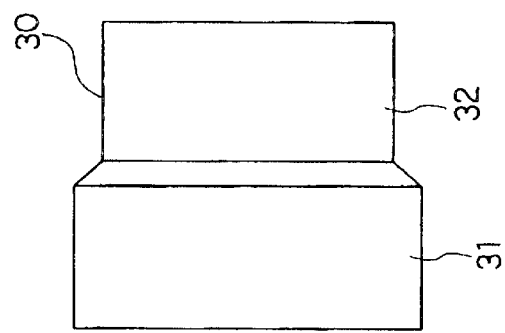
FIG. 5C
PRIOR ART
FIG. 5D
PRIOR ART
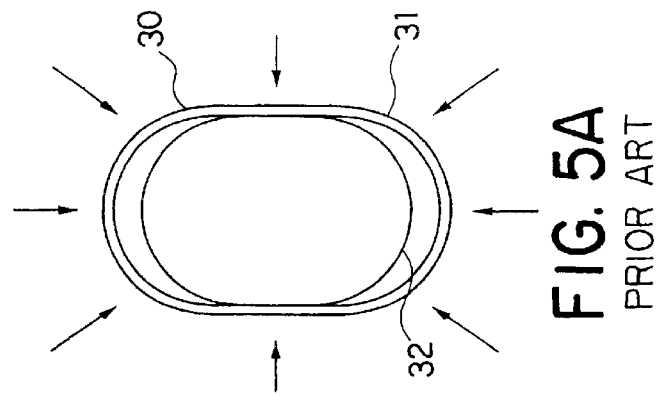
FIG. 5A
PRIOR ART

OPTICAL FIBER CORD FIXING COMPONENT

BACKGROUND OF THE INVENTION

1. Field of the Invention

The present invention relates to a fixing component for fixing an optical fiber cord to an optical connector.

2. Description of Related Art

The optical fiber cord has a tension member arranged around a fiber core, and a sheath arranged therearound, as a basic structure. For connection of such an optical fiber cord to an optical connector, it is necessary to hold a stable transmission characteristic even with tensile strength acting backward on the cord. Therefore, in the past, on an outer peripheral surface of a rear end part of an optical connector (connector housing) with fiber core inserted thereto, there were put the sheath and the tension member peeled off in advance from the fiber core, and separate fixing components (metallic rings) were put on an outside of the tension member and an outside of the sheath, and by caulking the fixing components, the tension member and the sheath were fixed in a press-fitting manner to the optical connector.

However, in consideration of reduction of component cost as well as of simplification of assembly work, it is preferable, rather than fixing the tension member and the sheath in a press-fitting manner to the optical connector by separate fixing components as described, to fix them in a lump. Therefore, recently, there is employed such a fixing component 30 as shown in FIGS. 5A to 5D. FIG. 5A is a front view of the fixing component 30, FIG. 5B is a plan view of the component 30, FIG. 5C is a side view of the component 30, and FIG. 5D is a rear view of the component 30. This fixing component 30 is integrally formed, as shown in FIG. 5B and FIG. 5C, with a tension member fixing portion 31 for fixing a tension member of an optical fiber cord in a press-fitting manner, and a sheath fixing portion 32 for fixing a sheath of the cord in a press-fitting manner. Moreover, as shown in FIG. 5A and FIG. 5D, the tension member fixing portion 31 and the sheath fixing portion 32 are both configured as a metallic tube of a substantially elliptic form in cross section. The fixing component 30 is adapted, as shown in FIG. 6, by putting the tension member fixing portion 31 on the outside of a tension member 35 of an optical fiber cord 34 put on an outer peripheral surface of a rear end part of an optical connector (connector housing) 33, putting the sheath fixing portion 32 on the outside of a sheath 36 put on the outer peripheral surface of the rear end part, and caulking them in a lump, so that the tension member 35 and the sheath 36 can be press-fitted to be fixed in a lump to the optical connector 33. Although in FIG. 6 a step is formed between the tension member fixing portion 31 and the sheath fixing portion 32, there is a case of caulking not to form a step.

The conventional fixing component shown in FIG. 5A to FIG. 5D has the following problems:

(1) For a structural reason of the optical connector, outside diameters of the tension member fixing portion and the sheath fixing portion of the fixing component must be different, and there develops a strain when the two fixing portions different in outside diameter are caulked simultaneously. More specifically, because of no escaping place for the strain developed in the tension member fixing portion, part (excessive part) of that fixing portion is caused to bulge like a wen at the sheath fixing portion side. As a result, the caulking at either or both of the tension member fixing portion and the sheath fixing portion becomes incomplete. Further, it needs a very strong force for the caulking to be complete.

(2) In order for the tension member fixing portion to have an identical cross sectional form before and after the caulking, it is necessary to evenly caulk the entirety from outside toward the center (it is necessary to evenly caulk in the direction of arrow in FIG. 5A). On the other hand, for the sheath fixing portion, such a caulking is necessary that the sheath is pinched from the left and right (it is necessary to caulk in the direction of arrow in FIG. 5D). In other words, between the tension member fixing portion and the sheath fixing portion, the caulking force and caulking direction are different. Therefore, when the tension member fixing portion and the sheath fixing portion are caulked in a lump, the two fixing portions have different contraction due to the caulking, so that the above-noted strain is yet increased.

SUMMARY OF THE INVENTION

It is an object of the present invention to provide a fixing component which is free from incomplete caulking even when a tension member fixing portion and a sheath fixing portion that are different in outside diameter are caulked in a lump, and does not need very strong forces for the caulking.

According to an aspect of the present invention, there is provided an optical fiber cord fixing component which is integrally formed with a tension member fixing portion for fixing, in a press-fitting manner, a tension member of an optical fiber cord put on an outer peripheral surface of an optical connector to the outer peripheral surface by caulking, and a sheath fixing portion for fixing, in a press-fitting manner, a sheath of the cord put on the outer peripheral surface of the connector to the outer peripheral surface by caulking, and which is formed, between the tension member fixing portion and the sheath fixing portion, with a slit capable of absorbing a deformation of either or both of the tension member fixing portion and the sheath fixing portion by the caulking.

BRIEF DESCRIPTION OF THE ACCOMPANYING DRAWINGS

FIG. 1 is a perspective view showing a condition in which an optical fiber cord is fixed to an optical connector by an optical fiber cord fixing component according to the present invention;

FIGS. 2A to 2D are drawings showing the optical fiber cord fixing component according to the present invention, in which FIG. 2A is a front view, FIG. 2B is a plan view, FIG. 2C is a side view, and FIG. 2D is a rear view;

FIGS. 5A to 5D are drawings showing a conventional optical fiber cord fixing component, in which FIG. 5A is a front view, FIG. 5B is a plan view, FIG. 5C is a side view, and FIG. 5D is a rear view.

DETAILED DESCRIPTION OF THE PREFERRED EMBODIMENTS

First embodiment

There will be detailed below a first embodiment of an optical fiber cord fixing component according to the present invention, with reference to FIG. 1 and FIG. 3B. A fixing component 10 according to the present invention is for fixing, in a press-fitting manner, an optical fiber cord 2 to an optical connector 1 (connector housing) by deforming, in a compressing manner, as generally shown in FIG. 1. On a distal end of optical fiber in the optical fiber cord 2 press-fitted to be fixed to the optical connector 1, there is fitted a ferrule 12.

Figure 3A:
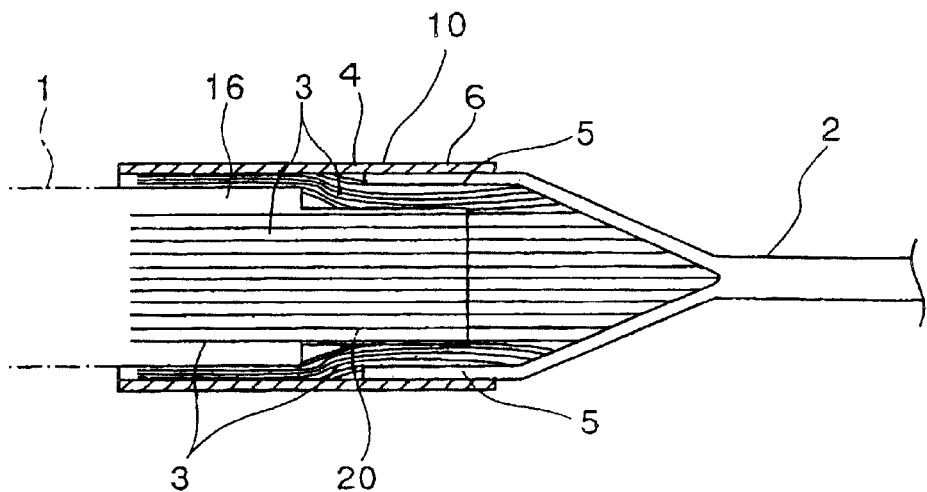
FIG. 3A is a longitudinal sectional view showing a condition in which the optical fiber cord is connected to the optical connector by the optical fiber cord fixing component according to the present invention.
Figure 3B:
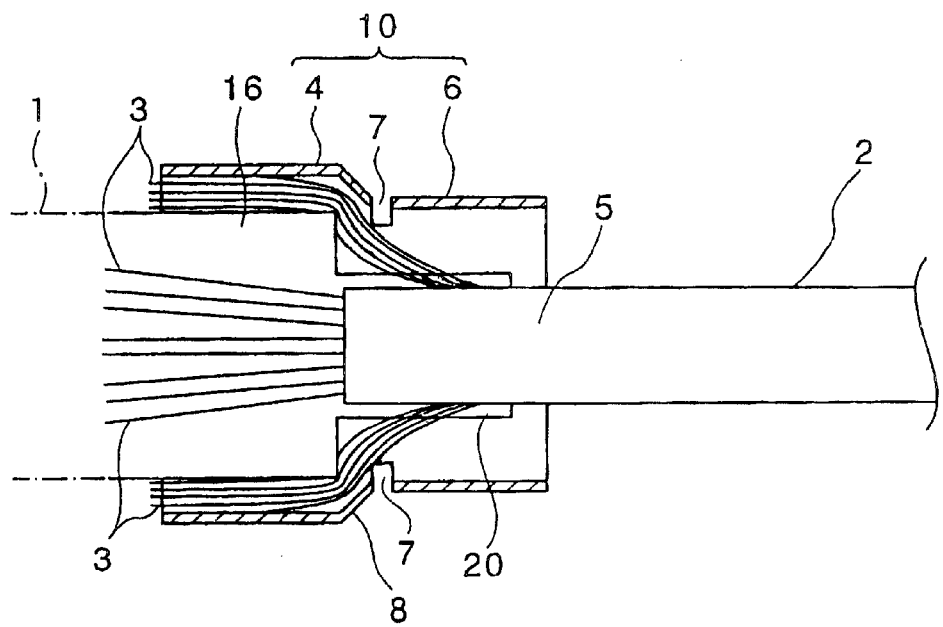
FIG. 3B is a cross sectional view of the same condition.

The fixing component 10 according to the present invention is integrally formed with a tension member fixing portion 4 for fixing, in a press-fitting manner, a tension member 3 of the optical fiber cord 2 to the optical connector 2, as shown in FIG. 3A, and a sheath fixing portion 6 for fixing, in a press-fitting manner, a sheath 5 of the optical fiber cord 2 to the connector 1, as shown in FIG. 3B.

Figure 2B:
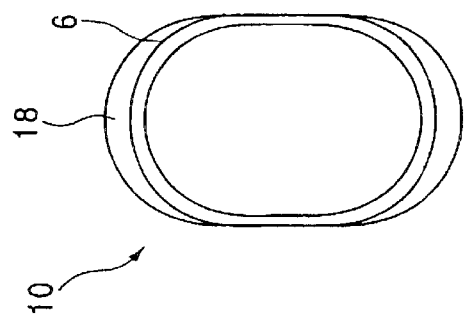
Figure 2D:
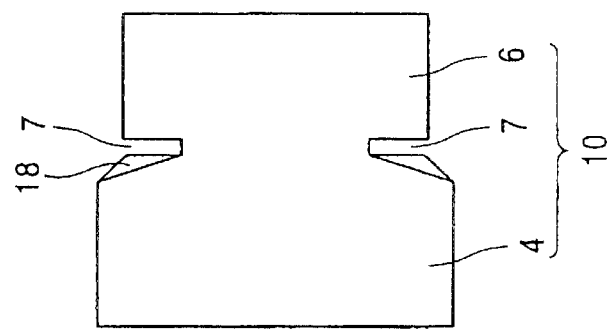
Figure 2C:
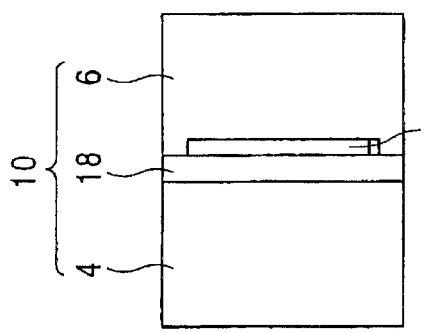
Figure 2A:
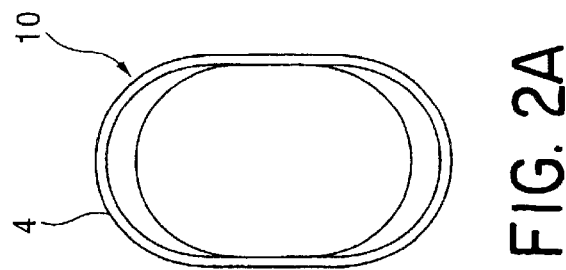

As shown in FIGS. 2A to 2D and FIGS. 3A and 3B, the tension member fixing portion 4 is a tube of a substantially elliptic (or substantially oval) form in section, and the inside is so dimensioned that it can be put on an outside of the tension member 3 of the optical fiber cord 2 which is put on an outer peripheral surface of a large diameter part 16 of the optical connector 1 (connector housing) that is stepped. As shown in FIG. 2B and FIG. 2C, in the tension member fixing portion 4, an end part 18 at the sheath fixing portion 6 side is reduced to be tapered toward the sheath fixing portion 6.

Also the sheath fixing portion 6 is a tube (ring) of a substantially elliptic (or substantially oval) form in section, as shown in FIGS. 2A to 2D, and is so dimensioned that it can be put on an outside of the sheath 5 of the optical fiber cord 2 which is put on an outer peripheral surface of a small, diameter part 20 of the optical connector 1 (connector housing), as shown in FIGS. 3A and 3B.

As shown in FIGS. 2A to 2D and FIGS. 3A and 3B, the tension member fixing portion 4 and the sheath fixing portion 6 are continuously formed to be coaxial about a center, having therebetween slits 7 provided at two points in a circumferential direction of both fixing portions 4 and 6. The slits 7 are formed by punching out connecting parts between the tension member fixing portion 4 and the sheath fixing portion 6 of the fixing component 10, by pins. It is noted that, from the viewpoint of strength, the slits 7 may preferably be 1 mm or less in width.

Figure 4A:
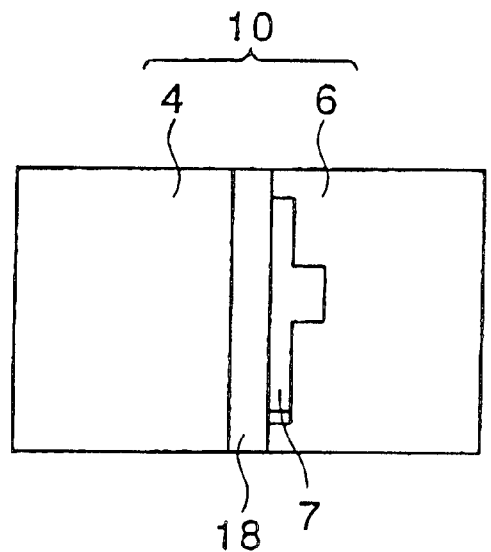
FIGS. 4A and 4B are plan views showing optical fiber cord fixing components as different embodiments of the present invention.
Figure 4B:
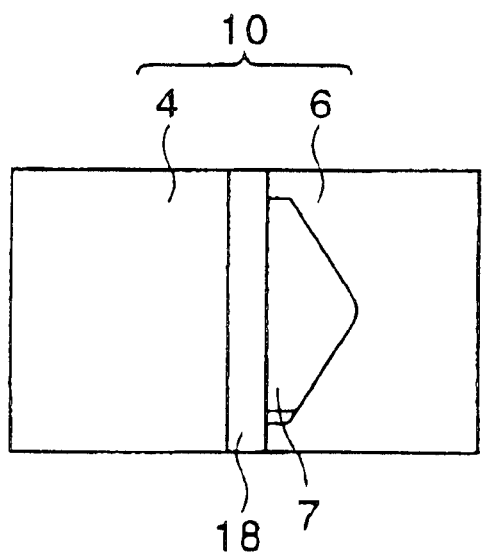
Figure 6:
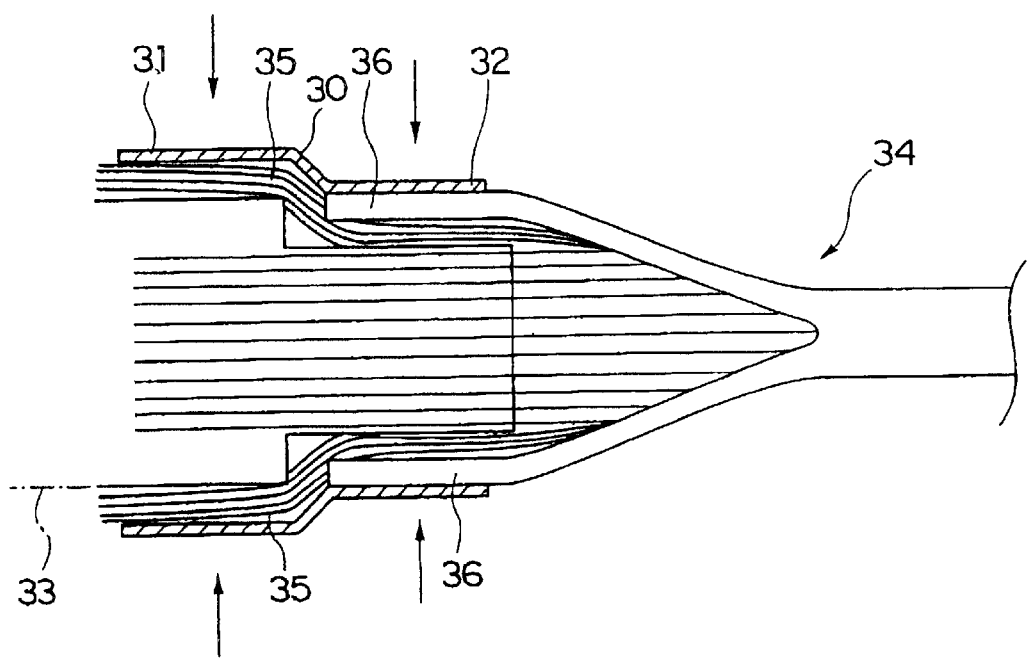
FIG. 6 is a cross sectional view showing a condition in which an optical fiber cord is connected to an optical connector by the conventional optical fiber cord fixing component.

Although, as material of the fixing component according to the present invention, aluminum, phosphor bronze, brass or the like is suitable, other materials else can also be used. Moreover, the number and width of slits 7 are not limited to the above-noted. Essentially, slits 7 of any width may amount to any in number, so far as they can absorb deformation by caulking of either or both of the tension member fixing portion and the sheath fixing portion, and the strength of entirety can be maintained. Further, slits 7 can be configured as shown in FIG. 4A or FIG. 4B. If the slits 7 are formed like this wider than shown in FIG. 2, pins for forming them can be big, and strength of the pins can be improved.

Connecting an optical fiber cord to an optical connector by using a fixing component according to the present invention can be made as follows:

(1) After the optical fiber cord 2 is passed to the fixing component 10, according to the present invention as shown in FIG. 3A, the sheath 5 at a distal end of the cord 1 is peeled off. Then, the tension member 3 therein is separated from fiber core, to have the fiber core exposed, and the connector ferrule 12 shown in FIG. 1 is applied thereon. Fiber core having been exposed may be passed to the fixing component 10 according to the present invention, and thereafter the said connector ferrule 12 may be applied.

(2) The said connector ferrule 12 is inserted to the optical connector (connector housing) 1. Then, the tension member 3 is put on large diameter part 16 of the connector 1, and the sheath 5 is put on the small diameter part 20.

(3) The fixing component 10 is slid forward (toward the distal end of the optical fiber cord 2), and as shown in FIGS. 3A and 3B,the tension member fixing portion 4 is put on the tension member 3 put on a large diameter part 16 of the optical connector 1, and the sheath fixing portion 6 is put on the sheath 5.

(4) The tension member fixing portion 4 and the sheath fixing portion 6 of the fixing component 10 are caulked in a lump (simultaneous caulking or separate caulking, whichever is applicable) by using a caulking jig (not shown). The strain generated by caulking the tension member fixing portion 4 and the sheath fixing portion 6 different in outside diameter is relieved by the slits 7 provided between the two fixing portions 4 and 6. That is, because part (an excessive part) of either or both of the two fixing portions 4 and 6 is absorbed by the slits 7, and the two fixing portions 4 and 6 are surely caulked separately with adequate forces, even when the tension member fixing portion 4 and the sheath fixing portion 6 are simultaneously caulked in a lump, the two fixing portions 4 and 6 can be surely caulked with adequate forces.

The optical fiber cord fixing component according to the present invention has the following effect:

(1) Because the slit is formed between the tension member fixing portion, and the sheath fixing portion that are integrally formed and different in outside diameter, a deformation generated. when the two fixing portions are caulked in a lump is absorbed by the slit, so that the tension member fixing portion and the sheath fixing portion can be surely caulked separately with adequate forces.

What is claimed is:

1. An optical fiber cord fixing component comprising:
    a tension member fixing portion for fixing, in a press-fitting manner, a tension member of an optical fiber cord put on an outer peripheral surface of an optical connector to the outer peripheral surface by caulking;
    a sheath fixing portion for fixing, in a press-fitting manner, a sheath of the cord put on the outer peripheral surface of the connector to the outer peripheral surface by caulking; and
    a slit capable of absorbing a deformation of either or both of the tension member fixing portion and the sheath fixing portion by the caulking; and wherein
        said tension member fixing portion is integrally formed with said sheath fixing portion, and said slit is formed between the tension member fixing portion and the sheath fixing portion in a circumferential direction of both or either of the tension member fixing portion and the sheath fixing portion tubular in configuration.

2. An optical fiber cord fixing component according to claim 1, wherein the slit is formed at one or two or more points in the circumferential direction of the tension member fixing portion and the sheath fixing portion tubular in configuration.

3. An optical fiber cord fixing component according to claim 1 or 2, wherein the slit is formed elongate in a circumferential direction of both or either of the tension member fixing portion and the sheath fixing portion tubular in configuration.

* * * * *